United States Patent
Kodak

(10) Patent No.: US 6,793,572 B2
(45) Date of Patent: Sep. 21, 2004

(54) AUTOMOBILE INTERIOR HEAT VENT

(76) Inventor: James Allen Kodak, 9082C Town & Country Blvd., Ellicott City, MD (US) 21043

( * ) Notice: Subject to any disclaimer, the term of this patent is extended or adjusted under 35 U.S.C. 154(b) by 0 days.

(21) Appl. No.: 10/248,160

(22) Filed: Dec. 21, 2002

(65) Prior Publication Data

US 2004/0121717 A1 Jun. 24, 2004

(51) Int. Cl.$^7$ .................................................. B60H 1/00
(52) U.S. Cl. ........................................ 454/144; 454/143
(58) Field of Search .......................... 454/75, 144, 151, 454/143

(56) References Cited

U.S. PATENT DOCUMENTS

| | | | | |
|---|---|---|---|---|
| 2,022,959 A | * | 12/1935 | Gordon | 454/120 |
| 2,347,141 A | * | 4/1944 | Werdehoff | 454/144 |
| 3,845,700 A | * | 11/1974 | Lefeuvre | 454/75 |
| 4,852,469 A | * | 8/1989 | Chuang | 454/75 |
| 5,054,686 A | * | 10/1991 | Chuang | 236/49.3 |
| 5,370,576 A | * | 12/1994 | Krofchalk | 454/143 |
| 5,727,998 A | * | 3/1998 | Krueger et al. | 454/143 |
| 6,123,616 A | * | 9/2000 | Otsuka | 454/137 |
| 6,126,538 A | * | 10/2000 | Kelly et al. | 454/143 |

* cited by examiner

Primary Examiner—Derek S. Boles

(57) ABSTRACT

The invention described herein is a passive air ventilation system for automobile interior heat. The passenger compartment interfaces with short air ducts which open when the interior reaches a certain threshold temperature. The other end of the ducts interfaces with the exterior in places which are not susceptible to rainwater seepage.

2 Claims, 3 Drawing Sheets

Interior view - open

Interior view - closed

Side view

Exterior view - open

Exterior view - closed

Front view

AUTOMOBILE INTERIOR HEAT VENT

BACKGROUND OF INVENTION

Excessive heat buildup in automobile interiors poses a serious problem. Every year excessive car interior heat kills young children and pets. Excessive heat can also damage an automobile's interior as well as personal property kept in the passenger compartment. While lowering a window can alleviate the problem, doing so makes the car more vulnerable to weather damage and to breaches of security. Furthermore, the cooling effect of cracking a window is only effective when one is mindful enough to do so before leaving the car. This problem has thus far been addressed with patents and technologies too complex and too expensive to be of practical interest to the auto industry.

SUMMARY OF INVENTION

The invention described herein provides a simple and inexpensive solution to the buildup of excessive auto interior heat. A series of vents are mounted directly to the lower framework of an automobile. When the interior temperature reaches a certain threshold, the vents open automatically by means of electric motors powered by the car's battery. When the temperature lowers to a certain threshold, the vents close automatically.

DETAILED DESCRIPTION

Figure 7:
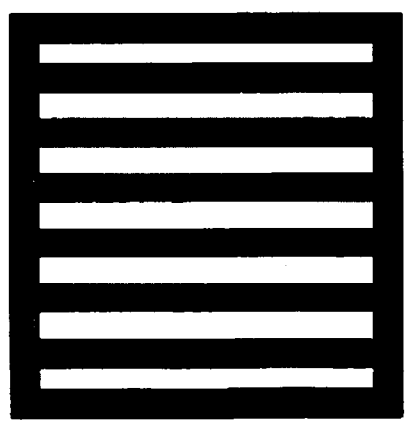

The preferred embodiment places a vent or a series of vents connecting an automobile's interior to the exterior air. The location of the vents is of critical importance. They must be mounted in a location that will possess two important characteristics: short and direct access to exterior air and protection from rainwater. It is conceivable that such vents could be mounted on the passenger doors, but this would require vent covers on the exterior air interface to prevent rainwater entry. Regardless of how well designed such covers maybe, they would create an additional source of drag and almost certainly detract from a vehicle's appearance. Furthermore, vent covers would necessarily inhibit, to some degree at least, the vent system's performance. Vent covers will be necessary for the interior air interface of the ducts in order to prevent injury and to maintain an aesthetic appearance. The cover design, shown in FIG. 7, should minimize air blockage utilizing slits or holes that are as large as possible but still enable the cover to perform its essential function.

The end of the vent that is open to the exterior is to be located in an area that does not permit rainwater seepage. This necessitates placing the vents underneath the vehicle. Since it is preferable to make the distance between the interior and exterior openings as close as possible so as to facilitate air exchange, the air duct between the openings should be no longer than 6 inches. The interior opening is ideally placed on the front of the rear seat wells. For purposes of this description, I define the front of the rear seat wells to mean the vertical portion of the interior frame that forms the forward base of any rear seating. The front of the rear seat wells lies just behind the legs of rear seated adult passengers. A diagram of this location is provided by 2 in FIG. 1. Placing the vents at the front of the rear seat wells is superior to placing the vents within the floor for two main reasons: (1) vents in the floor are apt to get covered with floor mats or various interior refuse and (2) any exterior vent mechanism for a floor vent would necessarily be placed at one of the lowest portions of the vehicular frame, causing the mechanism to be vulnerable to the elements and create unnecessary drag. Placing the vent mechanism in the exterior gap just behind the front of the rear seat wells avoids all of these problems. Furthermore, since heat casualties are most likely to be very young children left in the rear seat compartment, placing the vents as close as possible to such an occupant is preferred. The vents should be large enough and sufficiently numerous so as to provide quick equilibration in temperatures between the interior and exterior.

Figure 1:
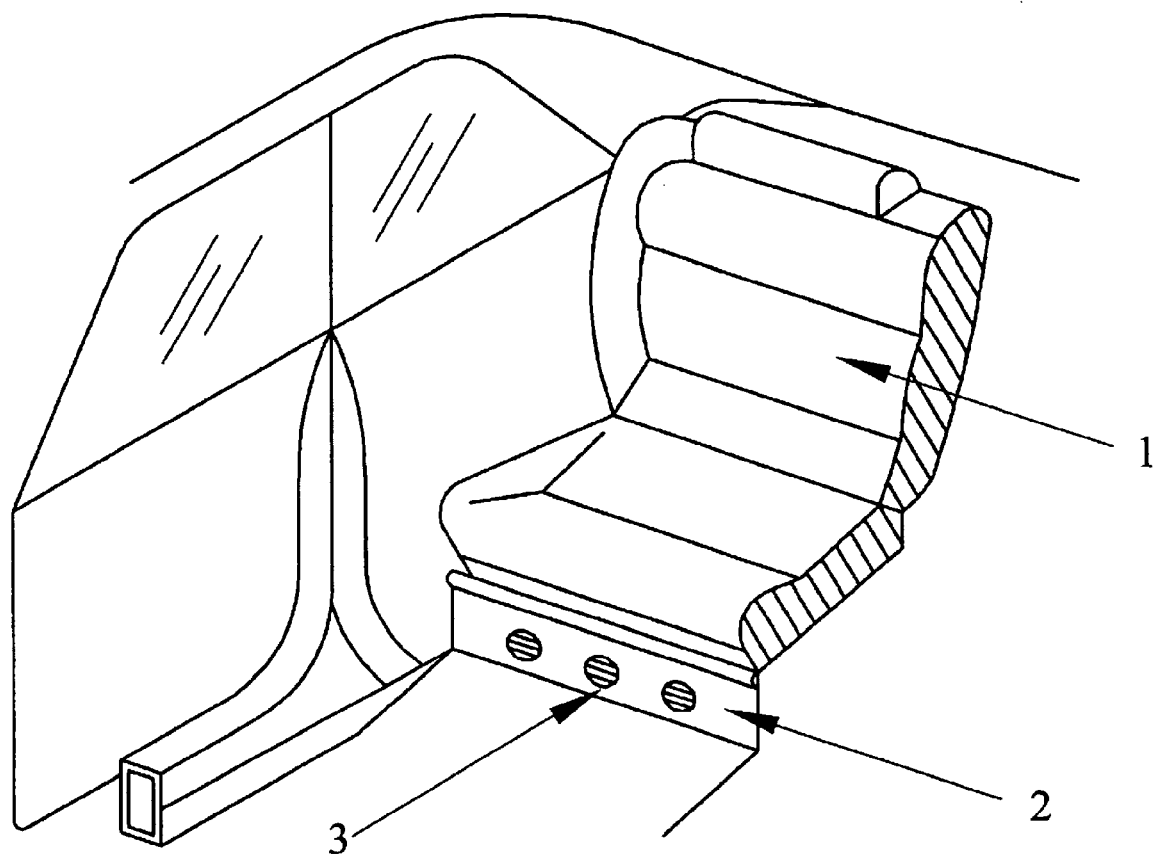
Figure 2:
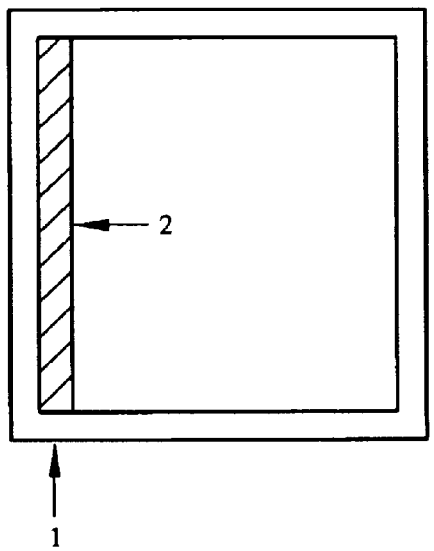
Figure 3:
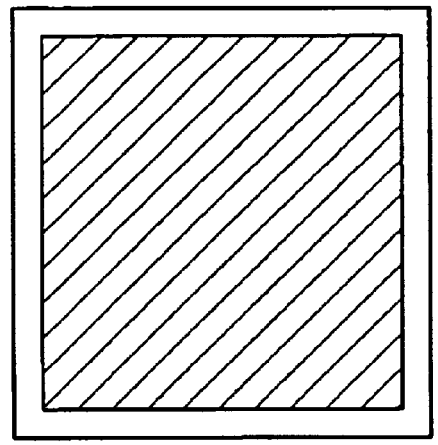
Figure 4:
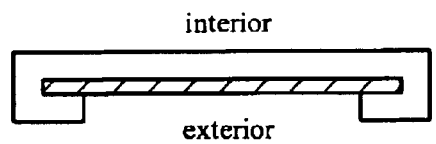
Figure 5:
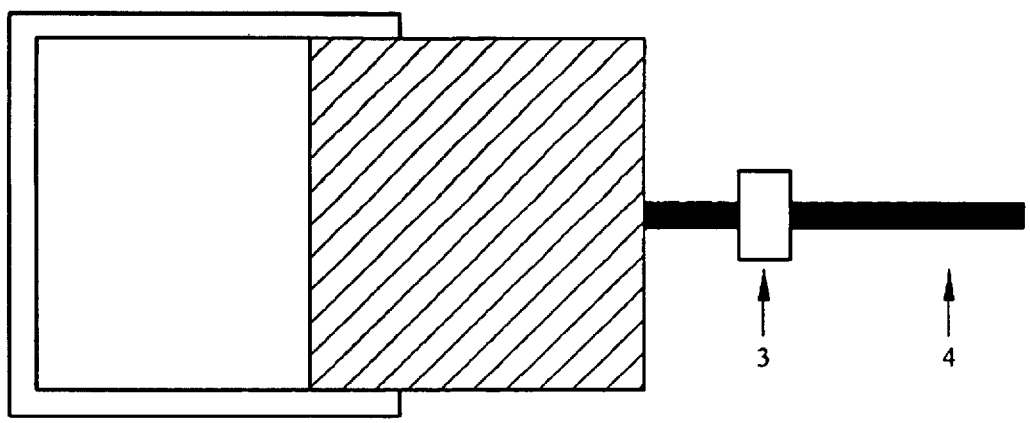
Figure 6:
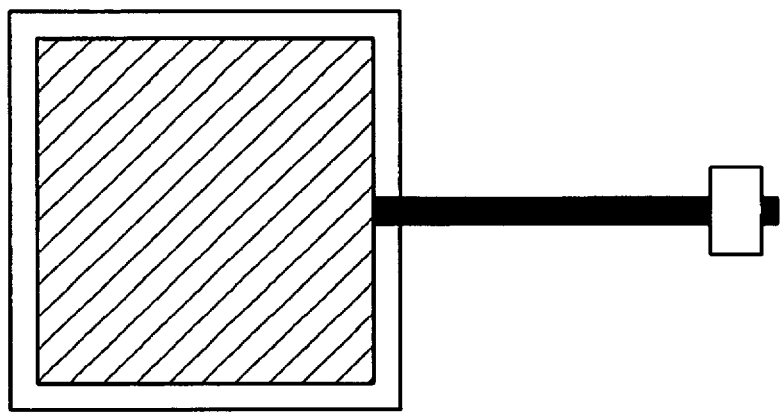

The preferred embodiment of the vent design consists of a hole cut into the front of the rear seats wells of an automobile frame, as shown in FIG. 1. In FIG. 1, 1 represents the rear seat, 2 represents the front of the rear seat well, and 3 represents the location of the vent. The hole is bracketed by a frame 1 in FIG. 2 and the hole is filled with a plate 2 in FIG. 2 that can slide in and out of the frame. FIG. 2 shows the vent in the open position and FIG. 3 shows the vent in the closed position. FIG. 4 shows the interaction between the frame and the sliding plate. Since the interaction is physically direct, the outer surfaces of the frame and sliding plate would ideally consist of low friction materials. The energy required to move the sliding plate should be provided by a solenoid 3 in FIG. 5 mounted on the exterior of the frame and as close as possible to the vent opening. The solenoid will move the sliding plate via a metal rod 4 in FIG. 5 running through the solenoid and attached to the sliding plate at one end. FIG. 5 shows the exterior view of the vent mechanism in the open position and FIG. 6 shows the exterior view in the closed position. The vents shall be closed and remain closed until a heat sensing device registers an interior temperature of approximately 95° F. At this temperature, the solenoid or solenoids powered by the automobile's battery, shall open the vents. When the interior temperature falls to approximately 85° F., the vents will automatically be closed. It is ideal to mount the solenoids and rods on the exterior of the vehicular frame so as to protect them from wear and tear caused by rear seat passengers, to minimize noise, conserve interior space, and facilitate aesthetics.

Whether the air vent is in the open or shut position will be determined by the location of the plate and is set to motion by the activation of the solenoid. While the solenoid is ideally mounted on the exterior, the plate it operates could conceivably be placed on the interior or exterior side of the vent hole. For the sake of simplicity, the plate should preferably be on the exterior side of the hole. This location would require no rod bending or hinge like mechanism that would be necessitated if the plate was on the interior side of the hole.

I claim:

1. An air duct or series of air ducts, no longer than six inches, mounted directly into the framework of an automobile's passenger compartment in which one end of the duct interfaces with the exterior air and the other end interfaces with the automobile's interior air at the front of the rear seat well.

2. An air venting system as in claim 1, in which the vents are opened automatically through electric motor means when the temperature in the passenger compartment reaches a certain set point and closes automatically by the electric motor means when the temperature falls below a certain set point.

* * * * *